United States Patent
Ojeda

(10) Patent No.: US 7,243,991 B2
(45) Date of Patent: Jul. 17, 2007

(54) CONTAINER FOR FOODSTUFFS

(76) Inventor: Pedro Ojeda, 331 N. Chapel Ave., Alhambra, CA (US) 91801

(*) Notice: Subject to any disclaimer, the term of this patent is extended or adjusted under 35 U.S.C. 154(b) by 0 days.

(21) Appl. No.: 10/452,325

(22) Filed: Jun. 2, 2003

(65) Prior Publication Data

US 2004/0238537 A1    Dec. 2, 2004

(51) Int. Cl.
*A47C 7/68* (2006.01)
*A47C 7/62* (2006.01)
*A47B 23/00* (2006.01)
*A47B 23/02* (2006.01)

(52) U.S. Cl. .......................... 297/188.14; 297/188.18; 297/188.2; 297/135; 248/311.2; 108/25; 108/26; 108/42; 108/44

(58) Field of Classification Search .......... 297/188.14, 297/188.15, 18.18, 188.2, 135, 160, 188.18; 248/311.2; 108/25, 26, 42, 44, 50.14
See application file for complete search history.

(56) References Cited

U.S. PATENT DOCUMENTS

| | | | | |
|---|---|---|---|---|
| 583,943 A | * | 6/1897 | Rayman | 108/26 X |
| 2,210,972 A | * | 8/1940 | Christenson | 108/25 X |
| 2,501,580 A | * | 3/1950 | Reid | 108/188.18 X |
| 2,640,595 A | * | 6/1953 | Byford | 297/188.2 X |
| 2,669,495 A | * | 2/1954 | Foote | 297/135 X |
| 2,686,701 A | * | 8/1954 | Manczur | 297/188.18 X |
| 2,797,973 A | * | 7/1957 | Culpepper | 297/135 X |
| 3,185,113 A | * | 5/1965 | Nathan et al. | 297/135 X |
| 3,186,673 A | * | 6/1965 | Olson | 297/188.18 X |
| 3,233,940 A | * | 2/1966 | Tooley, Jr. | 297/188.18 |
| 3,267,887 A | * | 8/1966 | Boyd | 297/188.18 X |
| 3,667,079 A | * | 6/1972 | Hagglund | 108/25 X |
| 3,690,724 A | * | 9/1972 | Douglas et al. | 297/188.18 |
| 3,807,319 A | * | 4/1974 | Steanson, Jr. | 108/42 |
| 4,575,149 A | * | 3/1986 | Forestal et al. | 297/188.18 X |
| 4,719,764 A | * | 1/1988 | Cook | 297/188.14 X |
| 4,795,211 A | * | 1/1989 | Stern et al. | 297/188.18 |
| 4,798,413 A | * | 1/1989 | Capelli | 297/188.18 X |
| 4,854,468 A | | 8/1989 | Dahlquist, II et al. | |
| 4,863,134 A | * | 9/1989 | Young et al. | 248/311.2 |
| 4,940,003 A | * | 7/1990 | Mayhew et al. | 108/44 |
| 4,942,827 A | * | 7/1990 | Norgaard | 108/44 |
| 5,088,673 A | | 2/1992 | Chandler | |
| 5,139,222 A | | 8/1992 | Koorey et al. | |
| 5,234,251 A | * | 8/1993 | Ayotte | 297/188.14 |
| 5,395,085 A | * | 3/1995 | Mann | 248/311.2 |
| 5,474,272 A | * | 12/1995 | Thompson et al. | 248/311.2 |
| 5,511,755 A | * | 4/1996 | Spykerman | 248/311.2 |

(Continued)

*Primary Examiner*—Rodney B. White
(74) *Attorney, Agent, or Firm*—Edgar W. Averill, Jr.; Kenneth D. Green

(57) ABSTRACT

An improved foodstuffs container configured to be readily received with a cup holder having a relatively standard size recess such as that commonly provided in armrests of many theater chairs so as to hold the container while the patron is not eating or optionally, drinking from the cup is disclosed. The container includes a walled tray structure supported by a contiguous container base sized and shaped to be supported within the standard cup holder. The walled tray structure may be configured with a planar or other shaped bottom, with or without partitions to received the desired foodstuffs either in volume or in discretely separated portions. The container base has an interior recess contiguous with the volume of the walled tray structure to receive and support additional foodstuffs readily accessed from above.

11 Claims, 2 Drawing Sheets

U.S. PATENT DOCUMENTS

| | | | |
|---|---|---|---|
| 5,533,782 A * | 7/1996 | Goldman | 297/188.18 |
| 5,797,655 A * | 8/1998 | Miles | 297/188.14 X |
| 5,893,605 A * | 4/1999 | Chang | 297/188.14 |
| 6,045,173 A * | 4/2000 | Tiesler et al. | 297/188.14 X |
| 6,109,580 A * | 8/2000 | Stern et al. | 248/311.2 |
| 6,123,214 A | 9/2000 | Goebel | |
| 6,149,238 A * | 11/2000 | Tsai | 297/188.14 X |
| 6,315,153 B1 | 11/2001 | Osborn | |
| 6,352,303 B1 * | 3/2002 | Hope | 297/188.18 |
| 6,748,874 B2 * | 6/2004 | Gawronski | 108/42 |
| 6,827,405 B1 * | 12/2004 | Roberts | 297/188.18 X |
| 6,883,692 B2 * | 4/2005 | Harden et al. | 248/311.2 X |

* cited by examiner

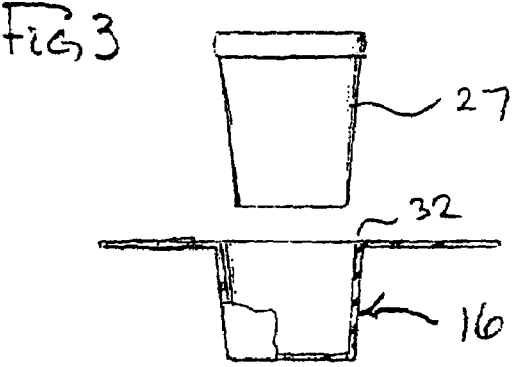
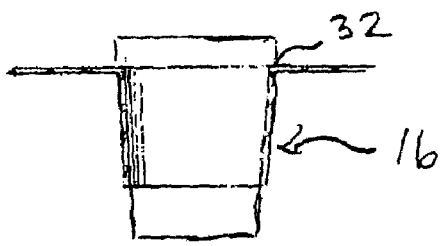
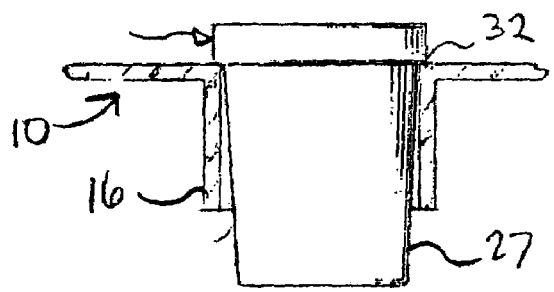
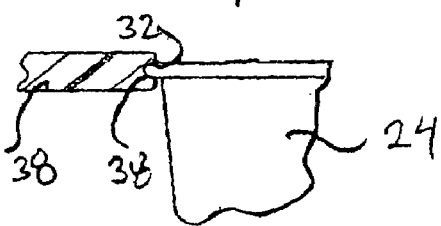
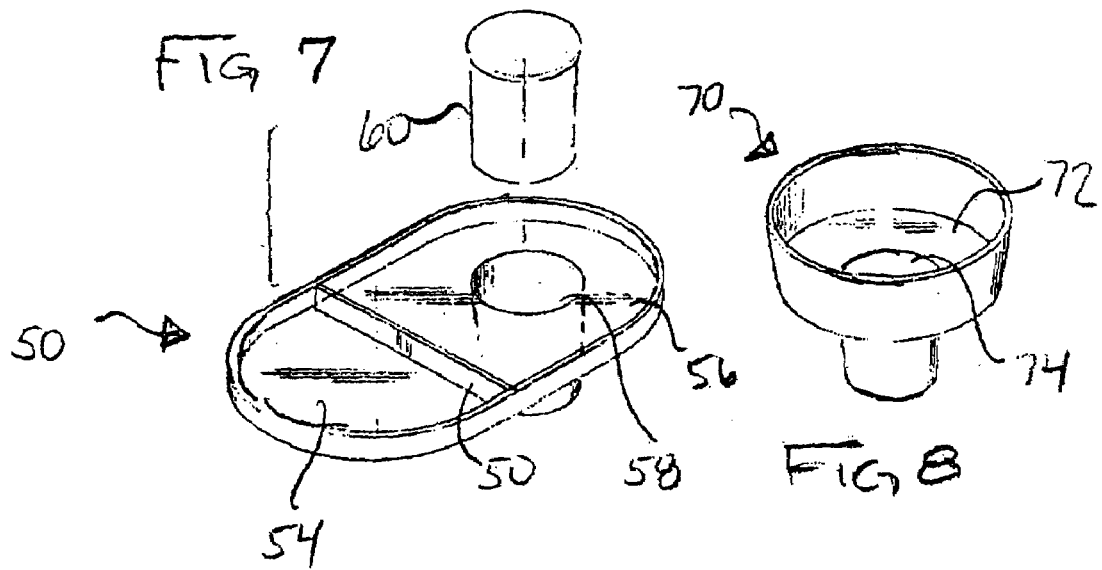

CONTAINER FOR FOODSTUFFS

CROSS-REFERENCE TO RELATED APPLICATIONS:

not applicable.

STATEMENT RE: FEDERALLY SPONSORED RESEARCH/DEVELOPMENT:

not applicable.

BACKGROUND OF THE INVENTION

Field of the Invention

The present invention relates generally to the field of apparatus for receiving foodstuffs for ready consumption, and more specifically, to an improved apparatus having a compound construction for enhanced capacity configured to be received in standard sized and shaped receptacles for receiving and supporting solid and liquid foodstuffs.

Popular culture virtually demands the convenience of food and drink holders in home, entertainment and mobile venues, to receive and support beverages within easy reach of the consumer. With respect to many entertainment venues such as movie theaters, theater owners and operators have sought both to please patrons and to increase revenue by selling various refreshments and snacks in addition to tickets. This includes drinks of various types. Commonly, such drinks are provided in a variety of containers, most of which have a base which is sized and shaped to be readily received in a receptacle holder, often referred to as a cup holder, in an armrest or other structure. Also, theater patrons also often desire to have snacks readily available for their consumption during the performance. Such snacks may be voluminous, such as popcorn or nachos, and thereby require a sizeable serving container or plate for easy and convenient access. As is well known, current cup holders typically are provided with a shallow or deep well-shaped recess not readily amenable to receipt of a container shaped other than that typically used for beverages, and certainly not amenable to hold popcorn bags or food plates. According, although a beverage container need not have an overly large capacity to satisfy the average consumer, that same sized container is likely insufficiently sized to hold a quantity of the desired snacks or refreshments, sufficient to satisfy the consumer over a sizeable portion of the performance. Thus, the problems attendant with an absence of a support structure for readily receiving and supporting solid food containers are many. Chief among these is where to put the food tray, container, or plate when the patron is not consuming the food stuffs. If placed on the floor, the refreshment is easily kicked over or knocked over when the patron reaches for it. If placed between the patron's legs, the food stuffs could be readily unbalanced causing the loss of the refreshment and likely soiling the clothing of the adjacent patrons.

Additionally, many standard container receptacles installed in cars and trucks are generally sized to receive a soft drink cup or aluminum can typically used with soft drinks having a cylindrical shape and a diameter of about 2½ inches. Oftentimes larger beverage containers, e.g., having a capacity of over 21 ounces, have a diameter of greater than 2½ inches and do not fit into many container receptacles. To cope with this problem, most cups, especially those used in drive-thru food services, are limited to a size that will fit a standard vehicle container receptacle. However, traditionally styled cups which fit standard vehicle container receptacles are limited to a volume of about 21 ounces. Specifically, when a container larger than 21 ounces is designed to fit the standard vehicle container receptacle the container is top heavy when filled with liquid. It has been recognized in the art that, to offset this problem, it would be desirable to design a container which would fit snugly into a standard vehicle container receptacle and would not tip or spill its contents during movements of the vehicle, even in a sudden turn or stop. One method which allows larger containers to fit in standard vehicle container receptacles involves the use of an adapter. The adapter modifies the standard vehicle container receptacle to a size such that larger containers can be accommodated by the standard vehicle container receptacle. Dahlquist II et al., U.S. Pat. No. 4,854,468, and Chandler, U.S. Pat. No. 5,088,673, disclose container adapter devices designed so that a standard vehicle container receptacle can accommodate containers that are too large to fit in the standard vehicle container receptacle.

Some cups are designed with a base proportioned to fit the standard vehicle container receptacle having a main body portion of a size larger than the base have attempted to overcome the problems of the limited container volume and top heaviness. However, these designs do not accommodate solid food stuffs in the manner described above.

Therefore, it is desirable to provide an improved food stuffs container that overcomes these prior art shortcomings.

SUMMARY OF THE INVENTION

The present invention provides an improved foodstuffs container configured to be readily received with a cup holder having a relatively standard size recess such as that commonly provided in armrests of many theater chairs so as to hold the container while the patron is not eating or optionally, drinking from the cup. In accordance with the various features of the invention, the container includes a walled tray structure supported by a contiguous container base sized and shaped to be supported within the standard cup holder. The walled tray structure may be configured with a planar or other shaped bottom, with or without partitions to received the desired foodstuffs either in volume or in discretely separated portions. The container base has an interior recess contiguous with the volume of the walled tray structure to receive and support additional foodstuffs readily accessed from above.

The container base further may be either integrally or separately formed with the walled tray structure, to aid in manufacturing, shipping, and storage. The container base may utilize commonly available beverage containers having a standard sized rim for being readily engaged with a snap fit with a corresponding opening formed in the floor of the walled tray. Additional configurations provide for ready nesting receipt within different receptacles, with additional supports as desired to support such as by clipping or other attachment features. For the various embodiment having either integral or separately provided components, a variety of walled tray units may be configured to be used in a wide variety of configurations to support food stuffs or even non-food stuffs via commonly provided cup holders, whether in stationery or mobile environments.

It should be noted and understood that with respect to the embodiments of the present invention disclosed herein, the materials, methods, apparatus and processes disclosed and suggested may be modified or substituted to achieve the desired protected structures without departing from the scope and spirit of the disclosed and claimed invention.

BRIEF DESCRIPTION OF THE DRAWINGS

FIG. 3 is a cross-sectional view of one embodiment of the present invention, shown further configured to receive a shaped container within the base recess, having a closed bottom.

FIG. 4 is a cross-sectional view of another embodiment of the present invention, showing a shaped container being fully inserted within the base recess, having an open bottom.

FIG. 5 is a cross-sectional view of another embodiment of the present invention, showing the walled tray structure with a thicker supporting wall portions, further defining a shoulder for supporting a corresponding rim of a standard beverage container to be used therewith.

FIG. 6 is a cross-sectional view of another embodiment of the present invention, showing a locking engagement between arm portion of the base receptacle to be secured to with a corresponding rib-receiving structure provided in the floor of the walled tray structure to achieve the contiguous foodstuffs container of the present invention.

FIG. 7 is a perspective view of another embodiment of the integrated foodstuffs container of the present invention, showing partitioned compartments for separating foodstuffs or other substances, and an optional container for being received within the contiguous base receptacle.

FIG. 8 is a perspective view of yet another embodiment of the integrated foodstuffs container of the present invention, showing a circular-shaped foodstuffs receiving volume of the walled tray portion contiguous with an integrally formed, coaxially aligned base receptacle.

DETAILED DESCRIPTION OF THE INVENTION

The detailed description as set forth below in connection with the appended drawings is intended as a description of the presently preferred embodiments of the present invention, and is not intended to represent the only form(s) in which the present invention may be constructed or utilized. The description sets forth functions and sequence of steps for constructing, using, displaying, packaging, or using the invention in connection with the illustrated embodiments. It is understood, however, the same or equivalent functions and structures may be accomplished by different embodiments and that they are also intended to be encompassed within the spirit and scope of this invention.

Figure 1:
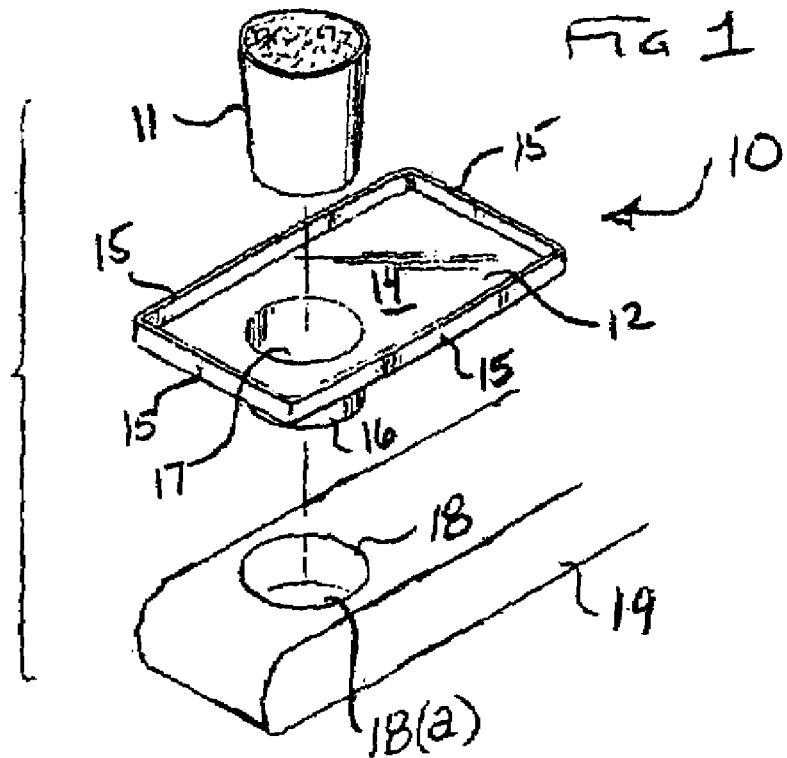
FIG. 1 is a perspective exploded view of an assembly of the novel integrated apparatus of the present invention, configured to receive an optional beverage cup, further configured to be secured to a cup holder provided in an arm rest such as an arm rest commonly found in many movie theaters, showing the walled tray structure supported by contiguously formed support base.
Figure 2:
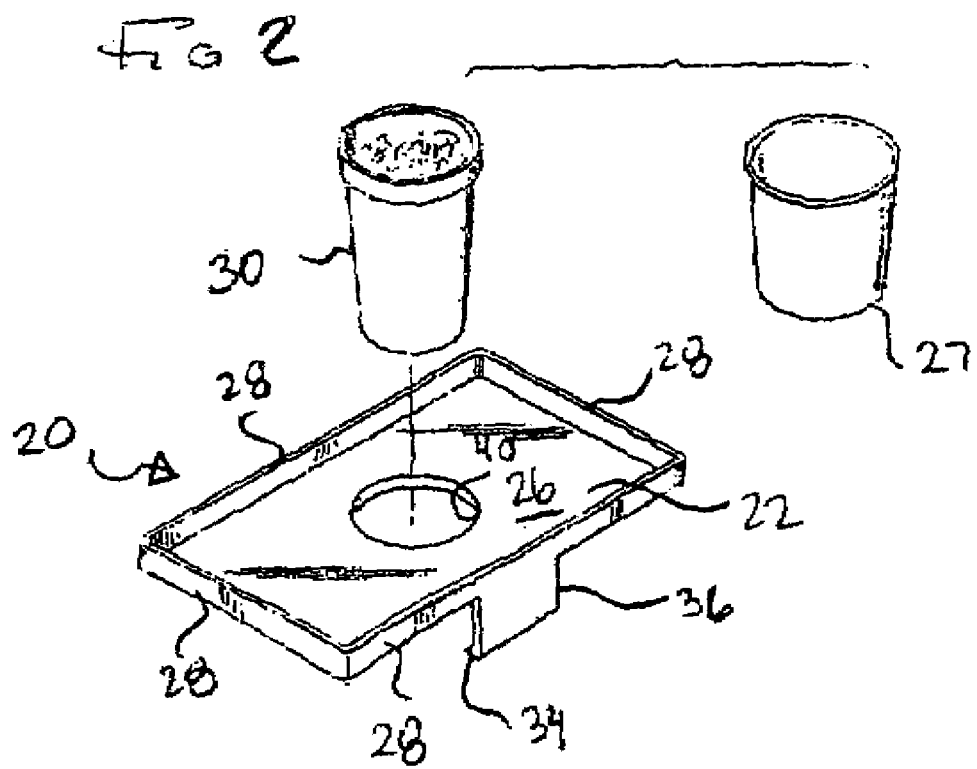
FIG. 2 is a perspective exploded view of another embodiment of the present invention, showing the assembly of the cup and walled tray components to be secured together for use, further showing a clip for securing the so-attached apparatus to the armrest or other structure to which the invention is to be received.

With reference now to the drawing figures, FIG. 1 shows the integrated foodstuffs apparatus 10 of the present invention, having a walled tray portion 12 including a floor 14 bounded by walls 15 to form a relatively wide, open-topped receptacle. According to this embodiment, an open support base 16 is secured to and extends from the underside of the floor 14 at an opening 17 thereto to provide a contiguous volume therebetween, the recess of the support base 16 being readily accessed from the walled tray portion 12. The support base 16 is sized and shaped to be readily accommodated by a cup holder 18 provided in an armrest 19 of a theater chair (not shown) or other so-configured receptacle-receiving structure. It will be appreciated that the bottom of the cup holder 18 may be open or alternatively be provided with a floor 18(a). Likewise, the underside of the floor 14 of walled tray structure 15 may be planar, and may be provided with extended tray and floor portions intended to provide additional stability in the lengthwise direction of the armrest 19, thereby providing additional foodstuffs receiving space without encroaching on available seating areas to either lateral side of the armrest 19. Optionally, a container 11 may be received within the opening 17 of the apparatus 10, as necessary and desired to contain and make readily available additional foodstuffs or articles.

As will be appreciated, opening 17 is configured to correspond with cup holders having a relatively standard size recess such as that commonly provided in armrests of many theater chairs so as to hold the container while the patron is not eating or optionally, drinking from the cup. Accordingly, recess 17 may be either open or closed, but according to either embodiment, is readily received within cup holder 18 in the manner previously described. It will be further appreciated that the walled tray structure 12 is fabricated of a strong, moisture-proof but lightweight material, preferably such as injection molded plastic such as ABS, at low cost so as to be disposable after usage. However, other materials, such as fiberboard, corrugated cardboard or other paper-based materials of construction may be used to provide the desired low cost, lightweight, disposable features. As previously described walls 15 may be configured with a desired height to meet the needs of a particular food service, lower for relatively flat foods such as pizza, and higher for low bulk, high volume foods such as chips and popcorn. Whatever the selected wall height, the walls are canted at cooperative angles to be nestingly stacked for maximum efficiency in storage and shipping.

With reference now to FIGS. 2-6, various views of another embodiment of the inventive apparatus 20 are shown, all representing a readily assembled embodiments of the walled tray portion 22 and cooperating support base 24. Walled tray portion 22 including floor 26 is bounded by walls 28 to form a relatively wide, open-topped receptacle in the manner described with apparatus 10. According to this embodiment, the container base 30 is separately provided, to aid in manufacturing, shipping, and storage. The container base 30 may utilize commonly available beverage containers having a standard sized rim for being readily engaged with a snap fit with a corresponding opening 32 formed in the floor of the walled tray, either with a snap lock fit (FIG. 6), interference fit (FIG. 4), or nesting engagement fit (FIG. 5). Accordingly, walled tray portions 22 may be separated provided, shipped and stored, for use in conjunction with standard beverage receptacles in the manner described above.

Again referring to FIG. 2, an additional container 27 may be utilized in connection with or in addition to the assembly 20 of the invention. Further more, the assembly 20 may be further secured to the armrest 19 with additional supports as desired, such as angle clip 34 extending from angle bracket 36 as will be appreciated by the skilled artisan, thereby further helping to assure against unintended spillage and resulting loss and soil.

Referring now to FIG. 6, it will be appreciated that support base 24 may by provided by a rimmed beverage container 36 having a shaped or rolled rim 38, and that feature standard to most beverage containers is advantageously exploited by providing a cooperative annular groove 32 within the opening 40 (FIG. 2) provided in floor 26. Accordingly, the refreshment vendor need merely align the rim 38 with the opening 40 and assemble the two together with a snap fit to achieve the functional equivalent of the structure 10 shown in FIG. 1.

With reference now to FIG. 7, it will be seen that a further embodiment 50 of the present invention provides at least one partition 52 to section off separate food receiving areas 54, 56, with the base portion 58 (integral or separate) contiguously formed with one of the areas 54, 56. Although this embodiment shows a side-by-side arrangement, it will be apparent to the skilled artisan that alternative arrangements may be achieved, including arced or concentrically zoned areas. No matter that embodiment, an optional container 60 may be received in base portion in the manner previously described.

With reference now to FIG. 8, it will be seen that a yet further embodiment 70 may include a generally circular walled tray portion 72, with a concentric base portion 72 integrally or affixable thereto in the manner described above.

It is to be understood that the present invention is not limited to the embodiments described above, but encompasses any and all embodiments within the spirit and scope of the following claims.

The invention claimed is:

1. A foodstuffs holder for being supported in a cup holder, the holder comprising:
   an open foodstuffs container having at least one open walled tray portion; and
   a base unit having a recess, the base unit extending from and contiguous with the open walled tray portion, the base unit adapted to be received in the cup holder, the base unit having a bottom opening through which a container may be projected to be directly received in the cup holder.

2. The holder of claim 1 wherein said recess of said base unit is dimensioned so as to closely receive a standard sized theater drink cup.

3. The holder of claim 1 wherein there are plural open walled tray portions.

4. The holder of claim 3 wherein a floor of each open walled tray portion is proximate the base unit.

5. The holder of claim 1 wherein the open walled tray portion and base unit are integrated.

6. The holder of claim 1 wherein the open walled tray portion and base unit are cooperatively engaging units.

7. The holder of claim 6 further comprising at least one securement device for removably securing the foodstuffs holder to an armrest in which the cup holder is utilized for supporting the base unit.

8. The holder of claim 7 wherein the open walled tray portion and the base unit are fabricated from the group including polymeric materials and cellulosic materials.

9. A holder for holding a foodstuffs container proximate the end of a theater chair armrest, said holder comprising:
   an open foodstuffs container having at least one open walled tray portion; and
   a base unit having a recess contiguous with the open walled tray portion, the base unit adapted to be received in the cup holder said open walled tray portion being planar and free of any downward projection other than said base portion and said base unit having a bottom opening through which a container may be projected to be directly received in said cup holder.

10. A foodstuffs tray for use with a beverage container having a wall bounded by an upper rim, comprising;
    a tray having a floor, and opposing pairs of walls defining a food receiving recess, and an opening provided in the floor; the upper rim of the beverage container being removably secured immediately adjacent the opening to form a contiguous volume therebetween.

11. The tray of claim 10, wherein the beverage container is selected from the group of containers sized to receive a quantity of liquid including 12 ounce, 14 ounce, 20 ounce, and 32 ounce.

* * * * *